Patented July 1, 1947

2,423,154

UNITED STATES PATENT OFFICE 2,423,154

ADMIX FOR DRILLING MUD

Jolly W. O'Brien, Houston, Tex.

No Drawing. Application January 11, 1946,
Serial No. 640,682

7 Claims. (Cl. 252—8.5)

This invention relates to a product to be used as an admix in reducing the viscosity of viscous fluids, to the method of producing such product, and to a drilling mud including such product and adapted for use in the drilling of wells by the rotary method.

The general object of this invention is to provide a new product of the nature referred to which may be produced and used more cheaply than products for the same purpose available in the past.

This application is a continuation in part of my parent applications Serial No. 474,341, filed February 1, 1943, for Admix for drilling mud, and Serial No. 516,712, filed January 1, 1944, for Admix for drilling mud.

While this invention is particularly applicable to use in drilling fluids, it will be appreciated that it might be used also in connection with other similar fluids for the purpose of reducing their viscosity.

With regard particularly to drilling fluids, it is a well known fact that drilling fluids are ordinarily composed of water and some natural clay or other material adapted to give body to the fluid, together with in many cases some heavy material added to the fluid for the purpose of increasing its specific gravity. The drilling fluid has numerous functions in the well drilling operation among them being the carrying out of the well of cuttings from the drilling operation, the plastering and walling up of the walls of the hole through which the drill has passed, and the holding in of pressure existing in the various formations through which the well extends. It is obvious that in order to carry out the first of these functions the fluid must be readily pumpable and yet have sufficient body so that as it flows upwardly to the surface of the ground it will carry the cuttings from the bit along with it. It must also be of such nature that these cuttings and other debris brought up out of the hole may be readily removed from the fluid so that the fluid may be used again. For the purpose of performing its second mentioned function the fluid must have material which will cake upon the walls of the well so as to seal off the various formations through which the well passes. In order to perform its third mentioned function the fluid must have a sufficiently high specific gravity so that by virtue of its actual weight it will be able to counteract pressures which may exist in the various formations through which the well is drilled.

It is also a well known fact that drilling fluids tend to become more viscous in use due to various factors and chemical changes which need not be discussed in detail, and that the addition of weight material tends to still further increase the viscosity of the drilling fluid.

It will be readily apparent that if the viscosity of the fluid is allowed to become too great, the difficulties of pumping the same will increase as well as the difficulties in removing the cuttings from the fluid at the surface of the ground. What is perhaps more important, however, is the fact that if the viscosity of the fluid becomes too great, the fluid may become "gas cut." That is, gas issuing from a formation or formations through which the well passes will form bubbles in the drilling fluid and these bubbles will not readily evacuate from the fluid but will become entrained in the viscous drilling fluid. This will greatly lighten the drilling fluid and thus decrease the effectiveness of the drilling fluid in holding back the formation pressures. When this occurs the dangers of a blowout due to such formation pressures are greatly increased.

Because of the foregoing facts the practice has grown up of adding to drilling fluids various chemicals which tend to reduce the viscosity of the fluid. Numerous such chemicals have been employed in the past, among them being sodium acid pyrophosphate, a product which may be produced by the heating of monosodium hydrogen orthophosphate anhydrous for a period from six to twelve hours at a temperature from 225° C. to 250° C., it having been found necessary to observe the minimum time and temperature mentioned in order to effect a substantially complete conversion to the pyrophosphate. (See Phosphoric Acid, Phosphates, and Phosphatic Fertilizers, Waggaman & Easterwood under auspices of American Chemical Society—published by the Chemical Catalog Co., Inc., 419—4th Ave. at 29th St., New York, page 269.)

Obviously the heating at the temperature and for the time necessary to produce such sodium acid pyrophosphate is expensive and slow but it has been believed to be necessary in order to obtain the desired results.

It is, therefore, a more specific object of this invention to make possible the efficient reduction in the viscosity of fluids at a cost less than that involved in the manufacture and use of sodium acid pyrophosphate or other satisfactory products heretofore employed.

Another object of this invention is to avoid the necessity for using sodium acid pyrophosphate in the reduction of viscosity of fluids and to provide a novel, efficient and economical product which may be employed for the reduction of viscosity in fluids.

A further object is to provide an economical process for producing such a viscosity reducing product.

Another object is to provide a drilling fluid having a suitable viscosity without the necessity for using a water soluble polyphosphate acid compound.

Other objects and advantages of this invention will become apparent from the following description wherein is set forth by way of illustration one embodiment of the invention and the process involved therein.

It has been asserted in the past that the viscosity reducing effect of for example sodium acid pyrophosphate differs in kind from the viscosity reducing effect of monosodium hydrogen orthophosphate anhydrous which is much less. In view of this assertion it has been assumed by persons skilled in the art that in order to take advantage of this asserted difference in kind it was necessary to substantially completely convert the monosodium hydrogen orthophosphate anhydrous into sodium acid pyrophosphate. I have discovered, however, that a product may be obtained by heat treating monosodium hydrogen orthophosphate anhydrous for a substantially shorter period of time and at a substantially lower temperature than that necessary to complete the conversion of the same into sodium acid pyrophosphate. The exact chemical nature of the product thus produced is not known. Under certain chemical analytical processes there are indications that the product consists of certain proportions of monosodium hydrogen orthophosphate anhydrous with sodium acid pyrophosphate. However, the viscosity reducing effect of the product is much greater than that which would be assumed based upon the indicated proportions of the monosodium hydrogen orthophosphate anhydrous with sodium acid pyrophosphate and substantially greater than the viscosity reducing effect of an actual mechanical mixture of monosodium hydrogen orthophosphate anhydrous with sodium acid pyrophosphate in such indicated proportions. It must, therefore, be concluded that the product is not a duplication of a mechanical mixture of sodium acid pyrophosphate and monosodium hydrogen orthophosphate anhydrous but a molecular aggregation which is more efficient as a viscosity reducing agent than a mechanical mixture of the two in the proportions indicated by chemical analysis of my product.

In practicing the invention and producing the product to be used as a viscosity reducing agent, any desired quantity of monosodium hydrogen orthophosphate anhydrous is heated at a temperature of from 120° to 200° C. for a period within the range of from one to five hours. These conditions will vary depending upon various circumstances, such, for instance, as the final acidity of the material desired, and the conditions encountered in the quality of raw materials used.

It has been found that in heating the monosodium hydrogen orthophosphate anhydrous in this manner there is a tendency for the material to gain molecular weight, and to increase the $P_2O_5$ (pentoxide) value.

It is expressly intended that the temperature reached in heating this monosodium hydrogen orthophosphate anhydrous and the period during which the heat is applied shall both be insufficient to complete a transposition of the orthophosphate to a commercially recognized polyphosphate for this would impair and reduce the maximum efficiency of the heat treated product.

This discovery of the action of this heat treated product resides in the apparent fact that under the influence of the heat treatment applied there is achieved a molecular aggregation that is more effective as a viscosity reducing chemical in drilling muds than the sum total efficiency of equivalent mechanically mixed proportions of commercially recognized monosodium hydrogen orthophosphates anhydrous and polyphosphates.

Present day current references such as the Phosphoric Acid Phosphates, and Phosphatic Fertilizers, above cited, in connection with total conversion to sodium acid pyrophosphate point out that the temperature shall range between 225° C. and 250° C. which shall be applied for a period of from six to twelve hours, and that under a roasting operation of this sort the monosodium hydrogen orthophosphate anhydrous is completely transposed to a commercially acceptable polyphosphate due to the reaction which takes place.

As distinguished from this, in the method and product according to this invention, the critical minimum temperatures (225° C.) and time of heating (6 hours) for the production of polyphosphates are not exceeded and it has been found that a product is produced which although appearing under certain chemical analytical tests to combine the characteristics of an orthophosphate with a polyphosphate, nevertheless in actual use has a more efficient action as a viscosity reducing agent than actual mechanical mixtures of equivalent proportions of similar commercial orthophosphates and polyphosphates.

For example, actual experiments run with commerical monosodium hydrogen orthophosphate anhydrous before it was subjected to any heat treatment showed that a drilling mud having a viscosity of 65 centipoises as measured by the Stormer viscosimeter at 600 R. P. M., treated with one part to 125 parts of mud, of a mixture of twelve pounds of the untreated orthophosphate in fifty gallons of water, was reduced in viscosity from the original 65 down to 53 centipoises. Thus, a drop of 12 points in viscosity was obtained by adding the untreated monosodium hydrogen orthophosphate anhydrous when the proportion was 125 to 1 of the mixture indicated.

Another similar test was run with a heat treated monosodium hydrogen orthophosphate anhydrous produced by heating commercial monosodium hydrogen orthophosphate anhydrous at a temperature of 180° C. for a period of five hours. The reduction of viscosity resulting from the addition of the same amount of a mixture of similar proportions of this product with the same mud caused a drop in the viscosity of the mud from the original 65 down to 33 centipoises, or in other words, an advantage of a 20 point drop is viscosity in this particular test was obtained by the heat treated monosodium material as compared with that obtained by the untreated monosodium hydrogen orthophosphate anhydrous.

In order to provide a comparison with the treated and untreated orthophosphate, a similar test was run with commercial sodium acid pyrophosphate which is, of course, one of the polyphosphate materials. This material when used in mixtures of the same proportions with the same mud caused a viscosity drop from the original 65 centipoises down to 31 centipoises. It will thus be seen that the result of using monosodium hydrogen orthophosphate anhydrous heat treated in accordance with this invention was within 2 centipoises of being as good as that from the use of commercial sodium acid pyrophosphate. This result was obtained despite the fact that a chemical analysis of such a heat treated product produced by treatment of commercial monosodium hydrogen orthophosphate anhydrous gave indication that the product contained only 13.2 percent of sodium acid pyrophosphate and 86.6 percent was indicated as monosodium hydrogen orthophosphate. From these facts it appears that the product of this invention owes its efficiency as a viscosity reducing agent not to any sodium acid pyrophosphate content which might be indicated by chemical analysis, but to some complex molecular structure intermediate monosodium hydrogen orthophosphate anhydrous and sodium acid pyrophosphate which is of such a nature that it provides a viscosity reducing effect comparable to that of sodium acid pyrophosphate but which is in fact neither monosodium hydrogen orthophosphate anhydrous nor sodium acid pyrophosphate.

It has further been discovered that the viscosity reducing effect of the product produced by heat treatment in accordance with this invention is more pronounced if the monosodium hydrogen orthophosphate anhydrous which is used in the process has a pH value substantially less than the normal of about 4.5 in a 1% solution for ordinary commercial monosodium hydrogen orthophosphate anhydrous. By way of example, a special monosodium hydrogen orthophosphate anhydrous was prepared having a pH of 3.7 in a 1% solution and was heated for five hours at 200° C., the resulting product having a pH of 3.4 in a 1% solution. This special monosodium orthophosphate was prepared in the following manner:

Disodium phosphate 2H2O, 75% H3PO4 and distilled water were slurried to give a solution of specific gravity 1.60 (containing about 63% monosodium phosphate). The solution was adjusted to pH 3.5 to 3.7, Bromphenol blue with sample diluted to 1% solution. The adjusted solution was drum dried on a valley-feed drum drier using 100 pounds of steam. The drum dried monosodium phosphate was ground in a Raymond laboratory hammer mill. The dried special monosodium phosphate was then heat treated in accordance with the above specifications, i. e. for five hours at 200° C.

Using a chemical blend consisting of 12 pounds to 50 barrels of water, and treating a mud having an initial viscosity of 89 centipoises in the proportion of one part of such chemical blend to 125 parts of mud, the viscosity of the mud was reduced to 33.5. Treating the same mud with sodium acid pyrophosphate in the same proportions, the viscosity of the mud was reduced from the original 89 centipoises to 34 centipoises. Thus in this instance the heat treated monosodium hydrogen orthophosphate anhydrous produced a result superior to that of commercial sodium acid pyrophosphate.

Another comparative illustration which bears out the conclusion just stated is as follows:

A product formed by heat treating a specially prepared monosodium hydrogen orthophosphate anhydrous having an initial pH of 3.7 in a 1% solution at 200° C. for a period of five hours reduced to 12 centipoises the viscosity of a mud having an initial viscosity of 59 centipoises. The mud in this instance was treated with a mixture of 12 pounds of the heat treated orthophosphate in 50 gallons of water, this mixture being incorporated into the mud in the ratio of one part to 125 parts by volume.

For purposes of comparison the same mud was treated with the same proportion of sodium acid pyrophosphate, and this treatment produced a viscosity drop from the original 59 centipoises down to 13 centipoises. In this instance also the heat treated monosodium hydrogen orthophosphate anhydrous produced a result superior to that of commercial sodium acid pyrophosphate.

By way of another example, a mud having an original viscosity of 47 centipoises was treated with the same proportion of the same heat treated product last above referred to and the result was a reduction in the viscosity of the mud from the original 47 centipoises to 12 centipoises. When the same mud was treated in the same proportions with sodium acid pyrophosphate, the viscosity of the mud was reduced from 47 centipoises to 13 centipoises. Here again it will be observed that the heat treated product produced a result superior to that of the commercial sodium acid pyrophosphate.

From the foregoing examples it must be concluded that in at least some instances and on some types of clay laden mud fluids the heat treated monosodium hydrogen orthophosphate anhydrous has a greater viscosity reducing efficiency than sodium acid pyrophosphate. Hence it follows that its viscosity reducing properties are not due to any presence of sodium acid pyrophosphate but to some other substance the exact nature of which is not known.

In another test a specially prepared monosodium hydrogen orthophosphate anhydrous having a pH value of 4.0 in a 1% solution was heat treated at 180° C. and samples were taken at 1½, 2 and 2¾ hours respectively. The products were shown to have pH values of 3.8, 3.8, and 3.6 respectively in 1% solutions. Using in each instance a chemical blend consisting of 12 pounds in 50 barrels of water and treating the mud with one part of such chemical blend to 125 parts of mud by volume, a mud having an initial viscosity of 53 centipoises was reduced in viscosity by this specially prepared monosodium hydrogen orthophosphate anhydrous before heat treatment to a viscosity of 43 centipoises. Using the heat treated product which had been treated for a period of 1½ hours the same mud was reduced in viscosity to 26 centipoises. Using the heat treated product which had been treated for 2 hours the viscosity was reduced to 21 centipoises, and using the heat treated product removed at the end of 2¾ hours the viscosity was reduced to 19.5 centipoises. This compared with a treatment of the same mud in the same proportions with the product of heat treatment of commercial monosodium hydrogen orthophosphate anhydrous having a pH value of 4.5 in a 1% solution for five hours at 180° C., which produced a reduction in viscosity to 39 centipoises. This also compared with treatment of the same mud with a product, formed by heat treating at 180° C. for five hours a specially prepared monosodium hydrogen orthophosphate anhydrous having an initial pH of 3.6 in a 1% solution, which product after heat treatment had a pH of 3.2 in a 1% solution and produced a reduction in viscosity to 19 centipoises.

Similarly, the product of heat treating commercial monosodium hydrogen orthophosphate anhydrous with a pH of 4.5 at 180° for a period of five hours was used in the treatment of mud having initial viscosity of 48 centipoises. Twelve pounds of the chemical were mixed with 50 barrels of water to produce the chemical blend and this chemical blend was mixed with the mud in the proportion of 1 to 62½ by volume. This resulted in the reduction of the viscosity of the mud to 38. Treatment of the same mud in the same proportions with the product resulting from the heat treatment of a specially prepared monosodium hydrogen orthophosphate anhydrous having an initial pH of 4.0 in a 1% solution at 180° for 1½ hours resulted in a viscosity reduction to 33 centipoises. Using the same product as last mentioned after heat treatment had been continued for 2 hours and for 2¾ hours respectively, a reduction of viscosity down to 31 centipoises was obtained.

Thus it must be concluded that the use of a specially prepared monosodium hydrogen orthophosphate anhydrous having a pH value of 4.0 or less in a 1% solution considerably increases the efficiency of the product resulting from the heat treating process as compared with the product formed by the use of commercial monosodium hydrogen orthophosphate anhydrous having a pH of 4.5 or thereabouts in a 1% solution. This is manifested not only in the increased efficiency of the product produced by heat treatment for the same length of time, but in the ability to produce a product of equivalent or greater efficiency by heat treatment for a less period of time when using the monosodium hydrogen orthophosphate anhydrous of lower pH value.

From the foregoing it will be apparent that there has been provided by this invention a product which may be used for the purpose of reducing viscosity of viscous liquids, and a method of producing such product, all at a less expense and in some cases with even greater efficiency than has been heretofore known. In every instance the product for use as an admix is produced at a lower temperature and within a shorter time than previously known products of comparable efficiency, and hence is produced at much less expense than those previously known products. By the use of this product also it is possible to produce at a less expense than heretofore a drilling mud having a viscosity within a desired range.

All of the objects and advantages set forth in connection with this invention have therefore been attained.

Having described my invention, I claim:

1. A mud laden drilling fluid containing a major proportion of clay, and water and a portion sufficient to substantially reduce the viscosity of the mud of the product formed by heat treating monosodium hydrogen orthophosphate anhydrous for a period of time in excess of one hour and not over five hours at a temperature between 120° C. and 200° C.

2. A mud laden drilling fluid containing a major proportion of clay and water and a portion sufficient to substantially reduce the viscosity of the mud of the product formed by heat treating monosodium hydrogen orthophosphate anhydrous having a pH of less than 4 in a 1% solution for a period of time in excess of one hour and not over five hours at a temperature between 120° C. and 200° C.

3. An admix for drilling mud comprising the product formed by heat treating monosodium hydrogen orthophosphate anhydrous having a pH of less than 4 in a 1% solution for a period of time in excess of one hour and not over five hours at a temperature between 120° C. and 200° C.

4. The process of preparing an admix for drilling mud which comprises heating monosodium hydrogen orthophosphate anhydrous having a pH of less than 4 in a 1% solution for a period of time in excess of one hour and not over five hours at a temperature between 120° C. and 200° C.

5. A drilling fluid comprising a major proportion of a mixture including clay and water and a minor proportion of a blend of substantially 12 pounds of the reaction product obtained by treating monosodium hydrogen orthophosphate anhydrous at temperatures within the range of 100° C. and 200° C. for a period between one (1) and five (5) hours in approximately 50 gallons of water, said minor proportion ranging between 1 part to 125 parts of said mixture, and 1 part to 62½ parts of said mixture.

6. A drilling fluid comprising a major proportion of a mixture including clay and water and a minor proportion of a blend of substantially 12 pounds of the reaction product obtained by treating monosodium hydrogen orthophosphate anhydrous having a pH of less than 4 in a 1% solution at temperatures within the range of 120° C. and 200° C. for a period between one (1) and five (5) hours in approximately 50 gallons of water, said minor proportion ranging between 1 part to 125 parts of said mixture, and 1 part to 62½ parts of said mixture.

7. A drilling fluid comprising a major proportion of a mixture including clay, a weighting material, and water and a minor proportion of a blend of substantially 12 pounds of the reaction product obtained by treating monosodium hydrogen orthophosphate anhydrous at temperatures within the range of 120° C. and 200° C. for a period between one (1) and five (5) hours in approximately 50 gallons of water, said minor proportion ranging between 1 part to 125 parts of said mixture, and 1 part to 62½ parts of said mixture.

JOLLY W. O'BRIEN.

REFERENCES CITED

The following references are of record in the file of this patent:

UNITED STATES PATENTS

| Number | Name | Date |
| --- | --- | --- |
| 674,140 | Patten | May 4, 1901 |
| 2,294,877 | Wayne | Sept. 1, 1942 |
| 2,337,491 | Perrin et al. | Dec. 21, 1943 |